United States Patent
Kim et al.

(10) Patent No.: US 7,146,027 B2
(45) Date of Patent: Dec. 5, 2006

(54) IRIS RECOGNITION METHOD AND SYSTEM USING THE SAME

(75) Inventors: Ho Kim, Seoul (KR); Jang Jin Chae, Goonpo-Si (JP)

(73) Assignee: LG Electronics, Inc., Seoul (KR)

( * ) Notice: Subject to any disclaimer, the term of this patent is extended or adjusted under 35 U.S.C. 154(b) by 727 days.

(21) Appl. No.: 10/329,458

(22) Filed: Dec. 27, 2002

(65) Prior Publication Data

US 2003/0123711 A1    Jul. 3, 2003

(30) Foreign Application Priority Data

Dec. 28, 2001  (KR) .................. 10-2001-0087072

(51) Int. Cl.
*G06K 9/00*    (2006.01)

(52) U.S. Cl. ............... 382/117; 382/324; 340/5.83

(58) Field of Classification Search ........... 382/106, 382/117, 190, 209, 324; 340/5.8, 5.81, 5.82, 340/5.83

See application file for complete search history.

(56) References Cited

U.S. PATENT DOCUMENTS

| | | | |
|---|---|---|---|
| 6,055,322 A | 4/2000 | Salganicoff et al. | 382/117 |
| 6,088,470 A | 7/2000 | Camus et al. | 382/117 |
| 6,526,160 B1 * | 2/2003 | Ito | 382/117 |
| 6,542,624 B1 * | 4/2003 | Oda | 382/117 |
| 6,546,121 B1 * | 4/2003 | Oda | 382/117 |
| 6,549,118 B1 * | 4/2003 | Seal et al. | 340/5.82 |
| 6,714,665 B1 * | 3/2004 | Hanna et al. | 382/117 |
| 6,850,631 B1 * | 2/2005 | Oda et al. | 382/117 |
| 2003/0123711 A1 * | 7/2003 | Kim et al. | 382/117 |

FOREIGN PATENT DOCUMENTS

| | | | |
|---|---|---|---|
| EP | 1308129 A2 * | 5/2003 | |
| EP | 1326197 A3 * | 5/2004 | |
| JP | 2003308521 A * | 10/2003 | |
| JP | 2005062990 A * | 3/2005 | |

* cited by examiner

*Primary Examiner*—Gregory Desire
(74) *Attorney, Agent, or Firm*—Flesher & Kim, LLP

(57) ABSTRACT

Disclosed is a method to improve iris recognition success ratio and speed by registering the iris code on location of illuminator. In the present invention, iris codes for a single iris generated as many as the number of a plurality of illuminators are registered on an iris database every area corresponding to the location of the illuminator. The iris codes generated one by one whenever the plurality of illuminators are turned on one by one for recognition are searched on the corresponding areas of the iris database to determine the recognition.

19 Claims, 5 Drawing Sheets

IRIS RECOGNITION METHOD AND SYSTEM USING THE SAME

BACKGROUND OF THE INVENTION

1. Field of the Invention

The present invention relates to an iris recognition method and system using the same, and more particularly, to an iris recognition method and system using the same to improve a success ratio and a speed of iris recognition by registering iris code for each of illumination locations.

2. Description of the Related Art

As known, further to the conventional contact type or non-contact type card systems for security, crime prevention or authentication of identification, systems which allow or deny the entrance to a specific area or the access to specific information according to authentication performed by recognizing finger print or iris, have come to wide use.

The iris recognition system has advantages, such as higher and more precise recognition rate compared with the finger print recognition system and impossibility in forgery and stealing since the iris pattern is different every human being and there are amazingly a lot of kinds of the iris patterns.

In general, the iris has a characteristic in that the pattern thereof does not vary for a long time. In 1980s, American Ophthalmologists, e.g., Leonard Flom and Alan Safir found that every human being has his (her) inherent iris patterns. A basic patent of the technology related to iris recognition was registered in 1987. A professor, John G. Daugman of University of Cambridge of the United Kingdom proposed an image processing algorithm based on Gabor wavelet transform in which the iris pattern can be coded in 512 bytes. The currently commercialized products are based on this algorithm.

An initial available iris recognition system was developed in 1995 by IriScan, Inc. founded around core members of the aforementioned three peoples in the United States. The iris recognition system includes an image capture unit for capturing an eye image and a recognition unit for recognizing a person using the captured eye image. The image capture unit functions to capture an eye image suitable for iris recognition and the recognition unit performs functions, such as iris region extraction, iris feature extraction, registration and recognition from the captured eye image. Accordingly, the iris recognition system is employed by banks that require a high security. Further, it is applied to entrance doors of buildings and personal computers to prevent personal information from leaking.

FIG. 1 illustrates a general iris recognition system. Referring to FIG. 1, when a user accesses to an iris recognition system, a distance measure sensor 109 measures a distance from the user and sends the measured distance to the a control device 105 through a driver 107. The control device 105 determines whether the inputted distance measurement value is within a predetermined operation range. The control device 105 sends a control signal to the driver 107 if the inputted distance measurement value is within a predetermined operation range. The driver 107 sends an active signal to an external indicator 108 to inform a user of the fact that system is operating by generating an indication. Here, the external indicator 108 can be a light emission device such as an LED. When a user positions his or her eye on light axis of a camera 103 through an optical window 101, a cold mirror 102 screens a visible ray and transmits an infrared ray. The location at which an iris should be positioned is indicated for the user to ascertain whether his or her eye is located on the light axis of the camera 103. An illuminating device controls illumination intensity. Here, the control device 105 controls the camera 103 to zoom-in, zoom-out, and focus using the distance measurement value measured deliberately. The control device 105 sends a camera control signal to the camera 103 to capture an iris image from the user's eye. The iris image captured by the camera 103 is sent to a frame grabber 104 and the frame grabber 104 generates an iris code from the iris image. Here, the iris code implies IrisCode and an iris recognition algorithm separates its brightness pattern into eight circles. The eight circles are obtained by analysis on each area. The control device 105 registers this iris code on the iris code database 110 and determines authentication of the user using the authentication code. The performance of such an iris recognition system depends on how fast and how precisely to recognize the iris. For this, images are captured changing the illumination location to avoid second reflection caused by glasses using three illuminators (for example, LEDs).

FIG. 2 illustrates configuration of an illuminating device that has a plurality of illuminators in the iris recognition system in the prior art. Referring to FIG. 2, when an illuminating device has a plurality of illuminators and a user wears a pair of glasses, reflection can occur from iris image according to the angles between a pair of glasses of the user and three illuminators 204, 205 and 206. Accordingly, an image processor 202 detects reflection degree and sends glasses reflection information to an illumination controller 203 prior to calculating focus degree.

The illumination controller 203 controls switching (On/Off) of three illuminators 204, 205 and 206 based on the glasses reflection information to avoid glasses reflection. The reflection locations of the glasses are changed according to selective On/Off of the three illuminators 204, 205 and 206. In other words, after only the illuminator 204 is turned on, an iris image is captured from a user's iris. After that, an iris code is generated from the iris image and then recognition is performed. In the above case, when recognition is failed due to the reflection of glasses, the illuminator 204 is turned off and another illuminator 205 at different location is turned on. An iris image is again captured from a user's iris. An iris code is generated from the iris image and then recognition is tried. This procedure is repeatedly performed with changing the illuminators until the recognition succeed in.

However, when the recognition is performed repeatedly using the illuminating device described above, recognition speed gets slow down and recognition success ratio is lowered.

SUMMARY OF THE INVENTION

Accordingly, the present invention is directed to an iris recognition method and system using the same that substantially obviate one or more problems due to limitations and disadvantages of the related art.

An object of the present invention is to provide an iris recognition method in which after iris codes as many as the number of illuminators are registered, recognition is performed with changing the locations of the illuminators to remarkably enhance the recognition speed and the recognition success ratio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an iris recognition method. In the above method, iris codes obtained as many as the number of illuminators from a user's iris are registered every area corresponding to the location of the illuminator while the plurality of illuminators arranged at different locations from one another are turned on one by one.

In another aspect of the present invention, an iris recognition method performs recognition by comparing iris codes obtained from a user's iris while the plurality of illuminators arranged at different locations from one another are turned on one by one with iris codes which are as many as the number of the illuminators and registered every area corresponding to the location of the illuminator.

In another aspect of the present invention, an iris recognition method comprises the steps of: (a) capturing an iris image from a user's iris while one of a plurality of illuminators is turned on, the plurality of illuminators being arranged at different locations from one another; (b) registering an iris code generated from the iris image on an area corresponding to a location of the illuminator; and (c) repeating the step (a) and the step (b) until iris codes generated as many as number of the illuminators are registered every area corresponding to the location of the illuminator.

Whenever the plurality of illuminators are turned, the location of the corresponding illuminator is grasped. Alternatively, the iris code is IrisCode.

In another aspect of the present invention, an iris recognition method comprises the steps of: (a) capturing an iris image from a user's iris while one of a plurality of illuminators is turned on, the plurality of illuminators being arranged at different locations from one another; (b) determining whether or not an iris code generated from the iris image exists on an area corresponding to a location of the illuminator; (c) reporting a recognition result to the user if the iris code generated from the iris image exists on the area corresponding to the location of the illuminator; and (d) repeating the step (a) and the step (b) changing an illumination location if the iris code generated from the iris image does not exist on the area corresponding to the location of the illuminator.

Iris codes that are as many as the number of the plurality of illuminators are registered on an iris database every area corresponding to the location of the illuminator.

In another aspect of the present invention, an iris recognition system comprises: means for turning on a plurality of illuminators sequentially, the plurality of illuminators being arranged at different locations from one another; means for capturing a plurality of iris images from a user's iris whenever any one of the plurality of illuminators is turned on sequentially; and means for registering a plurality of iris codes generated from the plurality of iris images every area corresponding to locations of the plurality of illuminators.

In another aspect of the present invention, an iris recognition system comprises: means for turning on a plurality of illuminators sequentially, the plurality of illuminators being arranged at different locations from one another; means for capturing a plurality of iris images from a user's iris whenever any one of the plurality of illuminators is turned on sequentially; means for determining whether or not a plurality of iris codes generated from the plurality of iris images exists on an illuminator location area of an iris database; and means for reporting a recognition result to the user if any one of the plurality of iris codes exists on the illuminator location area of the iris database.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention. In the embodiment, three illuminators are used but 2 or more than 3 illuminators may be used according to an iris recognition system.

To achieve an iris recognition method, iris codes corresponding to a plurality of illuminators should be registered on an iris database for locations of the plurality of illuminators.

The present invention provides an iris registration method and an iris recognition method for iris recognition system. First, the iris registration method will be described referring to FIG. 3.

Figure 1:
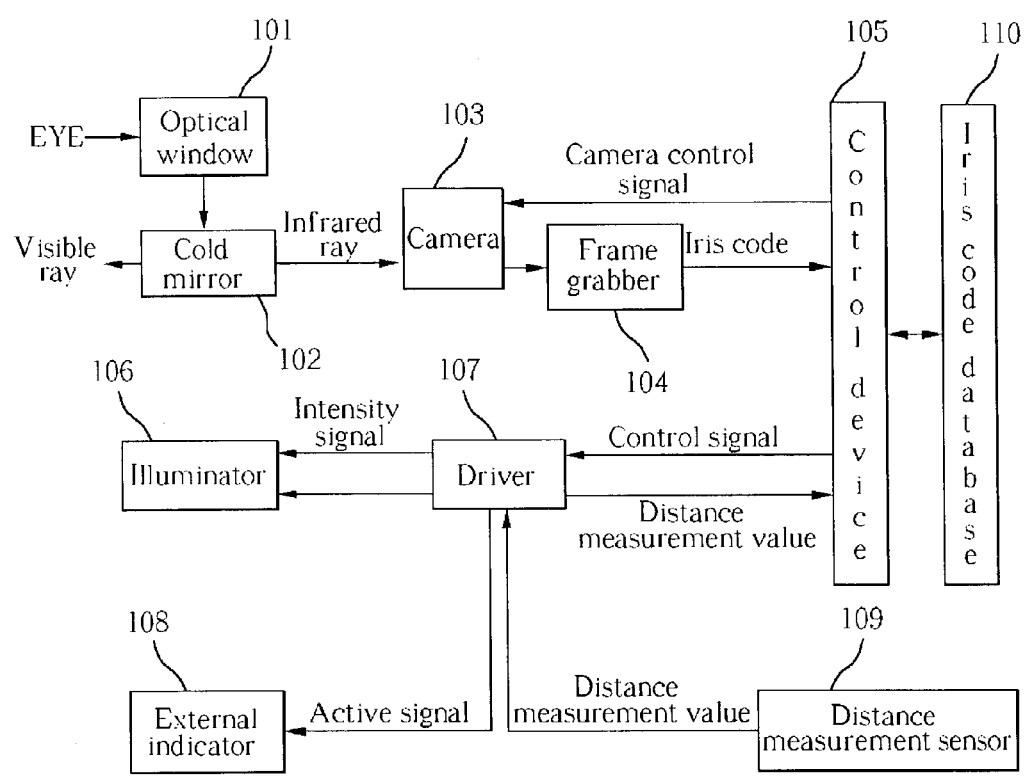
FIG. 1 illustrates the conventional iris recognition system.
Figure 2:
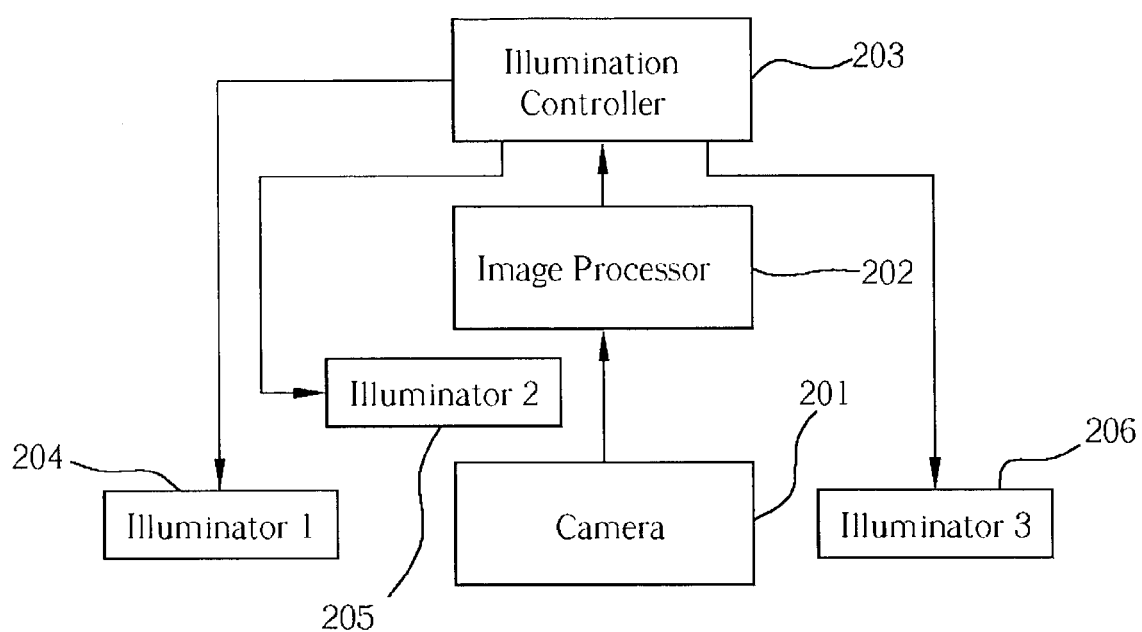
FIG. 2 illustrates configuration of an illuminator that has a plurality of illuminations in the iris recognition system in the prior art.
Figure 3:
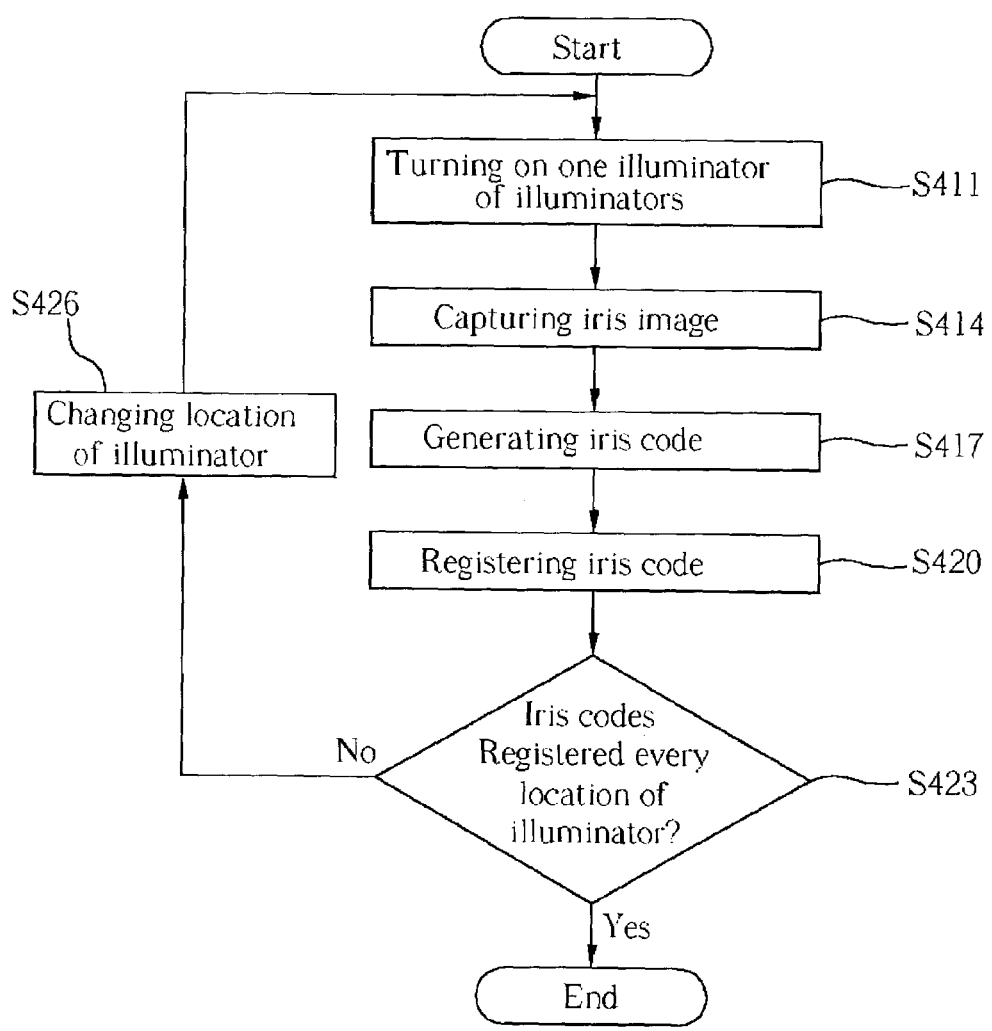
FIG. 3 is a flowchart showing method to register an iris using a plurality of illuminators according to an embodiment of the present invention.

FIG. 3 is a flowchart showing a method to register an iris using a plurality of illuminators according to an embodiment of the present invention. Referring to FIG. 3, when a user locates his or her eye on the axis of a camera, one of a plurality of illuminators is turned on (S411). Here, the order of turning the plurality of illuminators on may be changed but the plurality of illuminators should be turned one by one so that the iris code generated using an illuminator is registered and the other iris codes generated sequentially using the other illuminators are registered one by one. It is desired that location information of one illuminator be grasped when the illuminator of the plurality of illuminators is turned on. In other words, if one illuminator located at the left of an iris is turned on, the illuminator is grasped to be the left illuminator.

Figure 5:
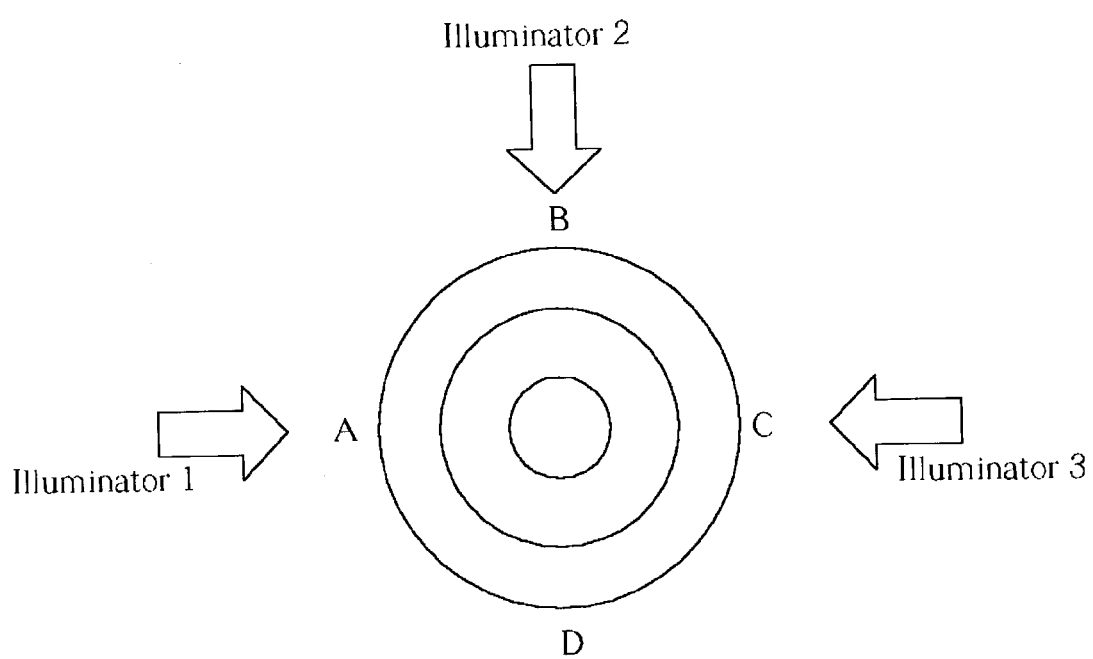
FIG. 5 is locations of a plurality of illuminators to illuminate an iris according to an embodiment of the present invention.

If the illuminator is turned on, an iris image is captured from a user's iris by a camera (S414). Referring to FIG. 5, if an illuminator 1 is turned, the portion A is bright and the portion C is dark comparatively. If an illuminator 2 is turned, the portion B is bright and the portion D is dark comparatively. If an illuminator 3 is turned, the portion C is bright and the portion A is dark. A bight area depends on which illuminator of the illuminator 1, the illuminator 2 and the illuminator 3 is turned on and the captured iris images depend on which illuminator of the illuminator 1, the illuminator 2 and the illuminator 3 is turned on. An iris algorithm is applied to an iris image that was captured when one of the illuminators is turned on so that an iris code is Generated (S417). The iris code is registered on the iris database to which illumination location areas as many as the number of illuminators are allocated (S420). For example, when there are three illuminators, three illumination location areas are allocated to the iris database. In other words, three illumination location areas can be called left illumination, right illumination and upper illumination. Here, the iris code is registered on the illumination location area corresponding to the location information detected at the step S411. In other words, when the location information is the left illumination, the iris code may be registered on a left illumination area of the iris database. When the iris code is registered on the corresponding area of the iris database, it is determined whether every iris code is registered for every illumination location. The determination can be done based on the number of illuminators. In other words, the number of the illuminators is set to be a setting value. Whenever the iris codes are registered, one is subtracted from the setting value and it is determined whether the subtraction result is zero. If there remains any illuminator that is not yet used for registration, the illumination location is changed and registration is performed again (S426). In other words, the illuminator is turned off which was used to register and another illuminator is turned on instead of it. The same iris image is captured for the same iris to generate an iris code. The iris code is registered on an illumination location area of the iris database pointed by illumination information detected when the other illuminator is turned on. A plurality of iris images as many as the illuminators are captured for the same iris through such a registration procedure. The corresponding iris code is generated and registered on every illumination location area of the iris database.

Figure 4:
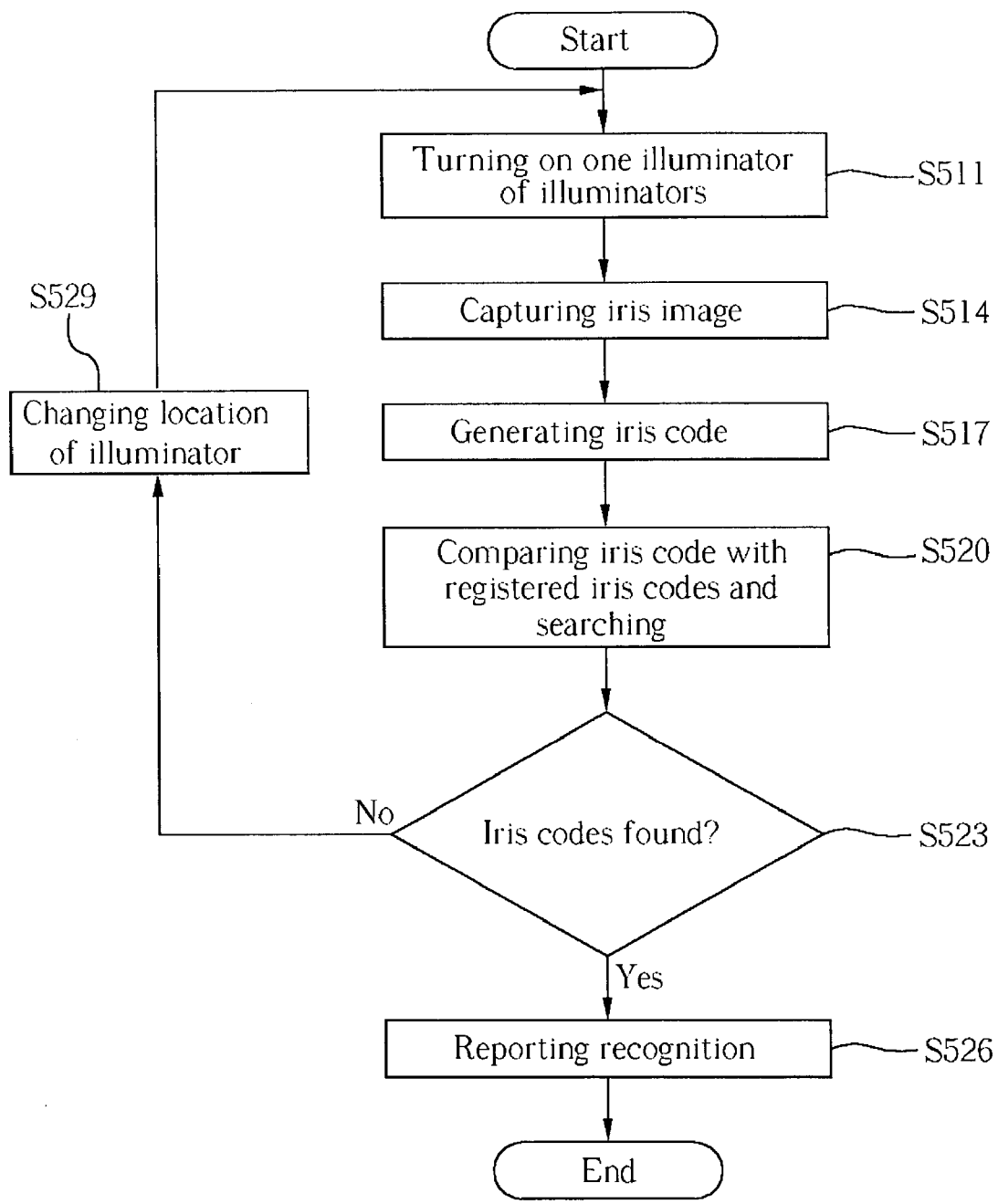
FIG. 4 is a flowchart showing method to recognize an iris using a plurality of illuminators according to an embodiment of the present invention.

FIG. 4 is a flowchart showing method to recognize an iris using a plurality of illuminators according to an embodiment of the present invention. Referring to FIG. 4, when a user locates his or her eye on the light axis of the camera to be recognized, one of a plurality of illuminators is turned on (S511). Here, if recognition is failed for an iris code generated using the turned-on illuminator, the recognition is performed with turning another illuminator. The illuminators should be turned on sequentially. It is desired that the location information of an illuminator be grasped when the illuminator is turned on. In other words, if an illuminator located at the left of the iris is turned on, the illuminator is grasped as left illumination. When an illuminator is turned on, an iris image is captured from a user's iris (S514).

As shown in FIG. 5, if an illuminator 1 is turned, the portion A is bright and the portion C is dark comparatively. If an illuminator 2 is turned, the portion B is bright and the portion D is dark comparatively. If an illuminator 3 is turned, the portion C is bright and the portion A is dark. A bight area depends on which illuminator of the illuminator 1, the illuminator 2 and the illuminator 3 is turned on and the captured iris images depend on which illuminator of the illuminator 1, the illuminator 2 and the illuminator 3 is turned on. An iris algorithm is applied to an iris image that was captured when one of the illuminators is turned on so that an iris code is Generated (S517). It is determined whether the iris code generated at the step S517 exists on the iris database which illumination location areas as many as the number of illuminators are allocated to and the iris code is registered on (S520). Here, the iris code is searched on the iris database using illumination location information obtained at the step S511. For example, when the illumination location information is the left illumination, it can be determined whether the iris code generated at the step S517 exists on the area on which the iris codes generated when the left illuminator is turned on are registered. Here, iris codes as many as the plurality of illuminators is registered on the iris database for every illumination location area. For example, a left illumination area, a right illumination area and an upper illumination area are allocated to the iris database. Here, the iris code generated using the iris image captured from an iris when left illuminator is turned on is registered on the left illumination area of the iris database. The iris code generated using the iris image captured from an iris when right illuminator is turned on is registered on the right illumination area of the iris database. Of course, the iris code that can be generated when upper illuminator is turned on is registered on the upper illumination area of the iris database.

Similarly, when the iris code is registered on the corresponding area of the iris database, the iris codes generated whenever a plurality of illuminators are turned one by one are searched on the corresponding areas of the iris database and it is determined whether iris codes exist on the corresponding areas of the iris database. As a result of the determination, if an iris code exists on the area corresponding to left illumination, the recognition result is reported to a user (S523 and S526). However, if an iris code does not exist on the area corresponding to left illumination, the illumination location is changed and recognition is performed using a new iris code generated from the new illumination location (S529). Similarly, if the iris code does not exist on the area corresponding to the left illumination, the procedure is repeated until any iris code generated whenever the plurality of illuminators are turned one by one exists on the area corresponding to the left illumination. Accordingly, a plurality of illuminators are illuminated on the same iris to generate different iris codes. The different iris codes are registered on the iris database for every illumination location. As registration procedure, when performing recognition, the iris codes generated whenever turning the plurality of illuminators one by one are searched on every area of the iris database to determine the recognition.

As described above, according to the iris recognition method of the present invention, iris codes are generated for the same iris while a plurality of illuminators located differently are turned on sequentially. The iris codes can be searched for every illumination location on the iris database on which iris codes are registered deliberately. So, recognition speed can be improved greatly. The various iris codes of one man's iris generated using a plurality of illuminators located differently are registered. The plurality of illuminators are turned on one by one to generate iris codes as many as the number of illuminators. Recognition success ratio and accurateness is highly improved since it can be determined the recognition. For instance, the iris image captured using a left illuminator is different from the iris image captured using a right illuminator since the illumination locations of them are different from each other. So, the IrisCodes generated from the iris images are also different from each other. Accordingly, when an iris recognition is performed using iris image captured by the left illuminator, the iris recognition success ratio of the case that the IrisCode generated using the left illuminator is used is higher than that of the case that the IrisCode generated using the right illuminator is used.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An iris recognition method, comprising:
    (a) capturing an iris image while one of a plurality of illuminators is turned on, each of the plurality of illuminators being arranged at different locations;
    (b) registering an iris code generated from the captured iris image in a database corresponding to a location area of an illuminator of the plurality of illuminators which is currently turned on; and
    (c) repeating the step (a) and the step (b) until a number of iris codes generated is the same as a number of the plurality of illuminators and each iris code is registered in a database corresponding to a location area of its respective illuminator of the plurality of illuminators.

2. The method according to claim 1, further comprising obtaining a location of the illuminator that is turned on.

3. The method according to claim 1, wherein the iris code is IrisCode.

4. The method according to claim 1, wherein the plurality of illuminators comprises a first illuminator, a second illuminator, and a third illuminator.

5. The method according to claim 4, wherein the step (c) comprises:
    (c1) illuminating the first illuminator, capturing an image of a first portion of the iris, and registering a corresponding first iris code in a first illuminator database;
    (c2) illuminating the second illuminator, capturing an image of a second portion of the iris, and registering a corresponding second iris code in a second illuminator database; and
    (c3) illuminating the third illuminator, capturing an image of a third portion of the iris, and registering a corresponding third iris code in a third illuminator database.

6. The method according to claim 5, wherein the first illuminator illuminates a left portion of the iris, the second illuminator illuminates an upper portion of the iris, and the third illuminator illuminates a right portion of the iris.

7. The method according to claim 1, wherein only one of the plurality of illuminators is turned on at a time.

8. An iris recognition method, comprising:
    (a) capturing an iris image while one of a plurality of illuminators is turned on, each of the plurality of illuminators being arranged at different locations;
    (b) determining whether or not an iris code generated from the iris image exists in a corresponding illuminator location area of an iris database; and
    (c) providing a recognition result if the iris code exists in the corresponding illuminator location area.

9. The method according to claim 8, further comprising:
    (d) changing a location of the illuminator that is turned on, and repeating the step (a) and the step (b) if the iris code does not exist in the corresponding illuminator location area.

10. The method according to claim 9, wherein the plurality of illuminators comprises a first illuminator, a second illuminator, and a third illuminator.

11. The method according to claim 10, wherein the step (d) comprises:
    (d1) illuminating the first illuminator, capturing an image of a first portion of the iris, generating a corresponding first iris code, and determining whether the corresponding first iris code exists in a first illuminator area of the iris database;
    (d2) if the first iris code does not exist in the first illuminator area of the iris database, illuminating the second illuminator, capturing an image of a second portion of the iris, generating a corresponding second iris code, and determining whether the second iris code exists in a second illuminator area of the iris database; and
    (d3) if the second iris code does not exist in the second illuminator area of the iris database, illuminating the third illuminator, capturing an image of a third portion of the iris, generating a corresponding third iris code, and determining whether the third iris code exists in a third illuminator area of the iris database.

12. The method according to claim 11, further comprising:
    (d4) reporting a recognition result when one of the first, second or third iris codes is found in the first, second or third illuminator area, respectively, of the iris database.

13. The method according to claim 10, wherein the first illuminator illuminates a left portion of the iris, the second illuminator illuminates an upper portion of the iris, and the third illuminator illuminates a right portion of the iris.

14. The method according to claim 8, wherein a number of iris codes registered in the iris database is the same as a number of the plurality of illuminators and the corresponding illuminator location areas.

15. The method according to claim 8, further comprising obtaining a location of the illuminator that is turned on.

16. The method according to claim 8, wherein the iris code is IrisCode.

17. The method according to claim 8, wherein only one of the plurality of iluminators is turned on at a time.

18. An iris recognition systems comprising:
    means for turning on a plurality of illuminators sequentially, the plurality of illuminators being arranged at different locations from each other;
    means for capturing a plurality of iris images whenever any one of the plurality of illuminators is turned on sequentially; and
    means for respectively registering a plurality of iris codes generated from the plurality of iris images in a database corresponding to the respective locations of the plurality of illuminators.

19. An iris recognition systems, comprising:
    means for turning on a plurality of illuminators sequentially, the plurality of illuminators being arranged at different locations from each other;
    means for capturing a plurality of iris images whenever any one of the plurality of illuminators is turned on sequentially;
    means for determining whether a plurality of iris codes generated from the plurality of iris images exists in corresponding illuminator location areas of an iris database; and
    means for providing a recognition result if any one of the plurality of iris codes exists in the corresponding illuminator location areas of the iris database.

* * * * *